(12) United States Patent
Denk et al.

(10) Patent No.: US 6,226,112 B1
(45) Date of Patent: May 1, 2001

(54) OPTICAL TIME-DIVISION-MULTIPLEX SYSTEM

(75) Inventors: Winfried Denk, Berkeley Heights; Gadi Lenz, Fanwood; Joseph Shmulovich, Murray Hill; Chunhui Xu, Summit, all of NJ (US)

(73) Assignee: Agere Systems Inc., Miami Lakes, FL (US)

( * ) Notice: Subject to any disclaimer, the term of this patent is extended or adjusted under 35 U.S.C. 154(b) by 0 days.

(21) Appl. No.: 09/099,788

(22) Filed: Jun. 18, 1998

(51) Int. Cl.[7] ........................................ H04J 14/08
(52) U.S. Cl. ................................ 359/138; 359/188
(58) Field of Search .................... 359/135, 138, 359/173, 195, 158, 188; 385/16, 24; 370/542, 544

(56) References Cited

U.S. PATENT DOCUMENTS

| | | | |
|---|---|---|---|
| 4,883,334 | * 11/1989 | Chiarulli et al. | 385/16 |
| 5,172,258 | * 12/1992 | Verber | 359/138 |
| 5,654,812 | * 8/1997 | Suzuki | 359/139 |

OTHER PUBLICATIONS

R.A. Barry et al, "All–Optical Network Consortium–Ultrafast TDM Networks", Jun. 1996, pp. 999–1013, *IEEE Journal on Selected Areas in Communications*, vol. 14, No. 5.

* cited by examiner

*Primary Examiner*—Jason Chan
*Assistant Examiner*—Christina Y Leung

(57) ABSTRACT

In a time-division-multiplex system, a relatively high-rate optical signal stream comprising multiple interleaved signal sequences is applied to one end of an elongated waveguide that includes multiple photodetectors disposed along the longitudinal extent of the waveguide. Probe pulses at a relatively low rate are applied to the other end of the waveguide in a synchronized fashion to cause two-photon non-linear absorption in successive respective photodetectors as each propagating probe pulse overlaps successive different signals of each sequence. In that way, electrical output signals are provided from each photodetector at the relatively low probe-pulse rate.

11 Claims, 3 Drawing Sheets

OPTICAL TIME-DIVISION-MULTIPLEX SYSTEM

BACKGROUND OF THE INVENTION

This invention relates to a high-speed commmunication system and, more particularly, to an optical time-division-multiplex system.

In recent years, as the demand for higher-capacity communication systems has proliferated, the use of optical fibers as the transmission medium in such systems has significantly increased. The attractiveness of such a medium is based on the recognition that the bandwidth of a single-mode optical fiber channel is in the teraHertz range ($10^{12}$ signals per second).

In a typical system in which an optical fiber is employed to interconnect electronic circuitry in a transmitter to electronic circuitry in a receiver, the electronic circuitry as heretofore realized is usually not capable of operating at speeds in the teraHertz range. Thus, for example, by way of an example, for a fiber carrying signals at a one-teraHertz rate, the electronic circuitry associated therewith is capable in practice of operating at only at best a 125-gigaHertz rate.

Accordingly, various multiplexing techniques (at the transmitter) and demultiplexing techniques (at the receiver) have been proposed to interface relatively low-speed electronic circuitry to high-speed fibers. In, for example, a so-called time-division-multiplex (TDM) system, multiple low-speed signal sequences at the same rate are interleaved and applied to a fiber as a single high-speed serial sequence. Thus, illustratively, by interleaving eight 125-gigaHertz signal sequences, it is feasible to utilize a one-teraHertz fiber with electronic circuitry at the transmitter and receiver capable of operating at only 125 gigaHertz. In such a system, individual signals from eight different channels are transmitted in sequence in an alternating fashion.

Heretofore, the problem of demultiplexing or distributing the interleaved optical signals propagated in a high-speed fiber in a TDM system has proven to be a formidable one. Electro-optic deflectors, for example, have been suggested for use at the receiver of a TDM system for deflecting and thereby routing successive received signals to respectively different photodetectors. But achieving electro-optic deflection in the teraHertz range is an extremely difficult, if not currently impossible, task. Also, the materials utilized in practice to realize electro-optic deflectors are typically different than the silicon-based materials commonly employed to make photodetectors and other standard components of the receiving circuitry. As a result, integrating such deflectors with the other circuitry on a single receiver chip is not easily realized using conventional batch-fabrication integrated-circuit processing techniques.

Still other approaches have been suggested for demultiplexing a stream of high-speed optical signals in a TDM system. (A review of various TDM techniques is contained in an article entitled "All-Optical Network Consortium-Ultrafast TDM Networks" by R. A. Barry et al, *IEEE Journal on Selected Areas in Communications*, vol. 14, No. 5, June 1996, pages 1000–1013.)

But these other known proposed solutions also are characterized by serious drawbacks such as extreme complexity, speed-limited capability (relative to the one teraHertz range) or lack of integratability on a single receiver chip.

Accordingly, continuing efforts have been directed by workers skilled in the art aimed at trying to provide an improved way of demultiplexing a high-speed optical signal sequence in a TDM system. It was recognized that such efforts, if successful, could provide a basis for enhancing the operation and lowering the cost of high-speed optical communication systems.

SUMMARY OF THE INVENTION

In accordance with the principles of the present invention, a relatively high-repetition-rate optical signal sequence in a TDM system is applied to the input end of an elongated optical waveguide that comprises along its length multiple electrically isolated two-photon photodetectors. A relatively low-repetition-rate optical probe pulse is applied to the output end of the waveguide. The timing relationship between the incoming signals and the counter-propagating probe pulse is controlled such that overlap of the probe pulse with each successive one of each set of incoming signals occurs in respectfully different photodetectors in the waveguide. For each such overlap, two-photon non-linear absorption of the propagating radiation occurs in a different photodetector and an electrical output signal therefrom is thereby provided. Neither the optical probe pulse nor the optical signal by itself is sufficient to produce a usefully distinguishable electrical output signal from a photodetector in which non-overlapping optical radiation occurs.

BRIEF DESCRIPTION OF THE DRAWING

A complete understanding of the present invention and of the above and other features and advantages thereof may be gained from a consideration of the following detailed description presented hereinbelow in connection with the accompanying drawing, not drawn to scale, in which.

DETAILED DESCRIPTION

In accordance with the principles of the present invention, demultiplexing of a train of optical pulses transmitted in a TDM system is carried out in an elongated optical waveguide that comprises along its longitudinal extent multiple serially disposed photodetectors. Many different types of elongated waveguides suitable for use in such a demultiplexer are known. Herein, for purposes of a specific illustrative example, the elongated element will be assumed to constitute a so-called rib waveguide, which is a standard structure known in the art. Further, although particular emphasis herein will be directed to a demultiplexing system, it is to be understood that the inventive principles are also applicable to other arrangements such as, for example, a clock-recovery system.

Figure 1:
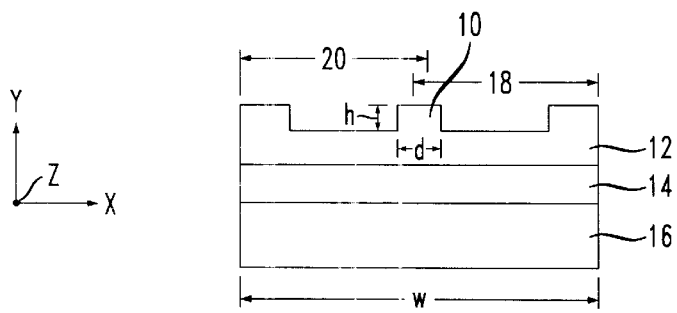
FIG. 1 is an end view of a partially fabricated demultiplexing device made in accordance with the invention.

FIG. 1 shows such a Z-axis-extending rib waveguide 10 formed in a layer 12 of intrinsic silicon. The layer 12 is deposited on a layer 14 of silicon dioxide which in turn is disposed on a silicon substrate 16. Standard deposition and shaping techniques are utilized to make the conventional structure represented in FIG. 1.

For purposes of a specific illustrative example, the rib waveguide 10 depicted in FIG. 1 will be assumed herein to have an X-direction width d of about three micrometers ($\mu$m) and a Y-direction height h also of approximately three $\mu$m. Such an exemplary cross-section is compatible with and designed to achieve efficient optical coupling with the core of a typical single-mode optical fiber employed in a typical high-speed TDM communication system. The longitudinal or Z-direction extent of the waveguide 10 will be specified later below. Additionally, the X-direction width w of the overall FIG. 1 structure will, by way of example, be assumed to be about twenty $\mu$m.

In accordance with the invention, multiple conventional p-i-n photodetectors electrically isolated from each other are formed in the FIG. 1 structure along the Z-direction longitudinal extent of the waveguide 10. One standard way of doing so is to mask a portion 18 of the top surface of the FIG. 1 device and then implant a suitable p-type dopant into the unmasked portion of the silicon layer 12. Subsequently, the portion 20 is masked and the unmasked portion is implanted with a suitable n-type dopant.

Figure 2:
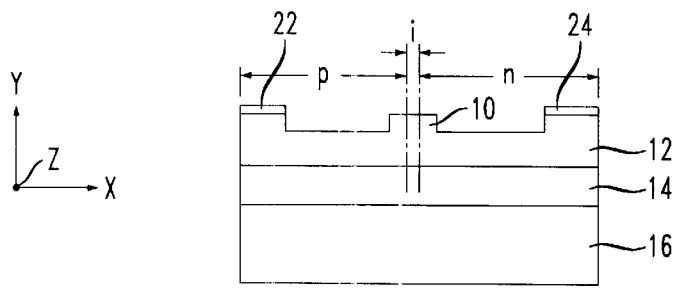
FIG. 2 shows the FIG. 1 structure at a subsequent point of its fabrication.

FIG. 2 represents the result of the aforedescribed doping steps. The left-hand side of the rib waveguide 10 (as well as the corresponding left side of the remainder of the layer 12) is shown as being p-doped, and the right-hand side of the waveguide (as well as the corresponding right side of the remainder of the layer 12) is shown as n-doped. The central portion of the waveguide 10 (and of the remainder of the layer 12), which was masked during both doping steps, is designated as remaining an intrinsic or i-region. The X-direction width of the indicated i-region is, for example, about 1.5 $\mu$m.

Thus, as shown in FIG. 2, a conventional p-i-n photodetector is formed in the lateral extent of the rib waveguide 10. By establishing spaced-apart electrical isolation regions along the longitudinal extent of the waveguide 10 (as indicated below in connection with the description of FIG. 3), the indicated structure of FIG. 2 can in effect be divided into multiple photodetectors along the Z direction of the waveguide 10. Electrical connections to the individual photodetectors are then made via conductive layers 22 and 24, which are formed by conventional techniques on the indicated top surfaces of the layer 12. Illustratively, the layer 24 comprises a continuous common contact for all the photodetectors (as indicated below in FIG. 3). Alternatively, the layer 24 may be segmented to form multiple individual electrically isolated contacts.

In accordance with the invention, multiple electrically isolated photodetectors are formed along the longitudinal extent of the elongated waveguide 10. More specifically, the number of such photodetectors corresponds to the number of independent signal sequences or channels that are interleaved at the transmitter to form the high-speed data stream that is to be propagated in an optical fiber in a TDM system. Herein, for purposes of a simple illustrative example, and especially so as not to unduly complicate the timing diagrams, the number of such sequences to be interleaved and applied to an optical fiber will be assumed to be only eight. Each of the independent sequences to be interleaved and transmitted includes, for example, multiple signals each having a full-width of about 0.5 picoseconds (ps) with a peak-to-peak spacing between adjacent signals of eight ps. The individual signals of each sequence to be interleaved thus occur at a 125-gigaHertz rate. In the transmitting circuitry, the eight sequences each having signals at a 125-gigaHertz rate are interleaved with each other and applied to an optical fiber (or other transmission medium capable of propagating high-repetition-rate optical signals). In the fiber, the combined signals occur at a one-teraHertz rate, and the peak-to-peak spacing between adjacent signals in the overall sequence is only one ps.

Figure 3:
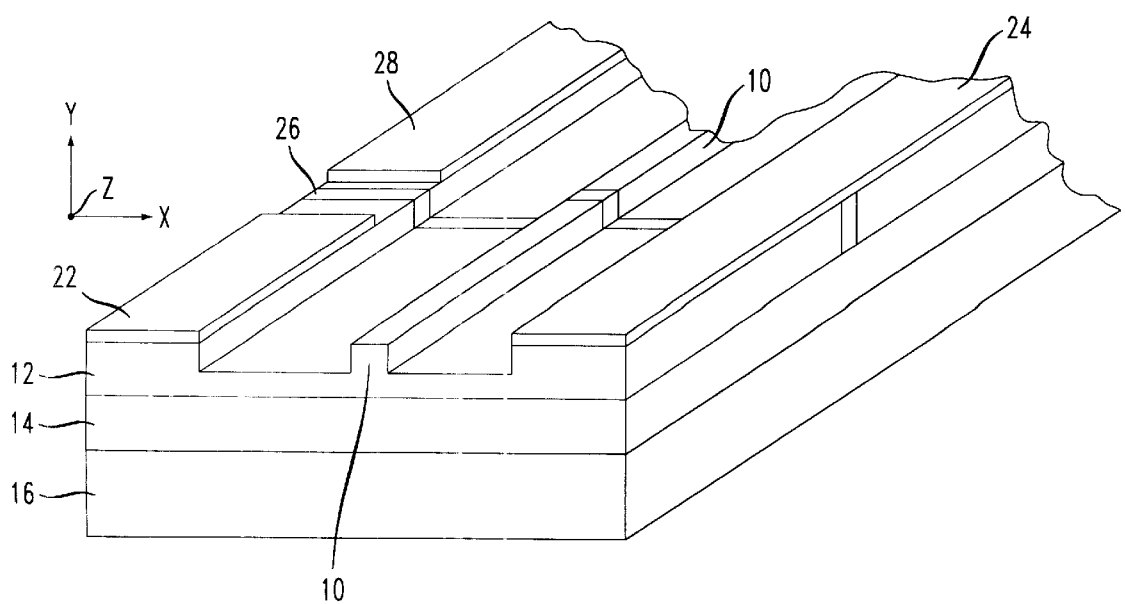
FIG. 3 is a representation in perspective of a portion of the FIG. 2 device.

Accordingly, the specific illustrative demultiplexing device represented in FIG. 3 will be assumed herein to include eight photodetectors. Electrical access to the output of the first or input-end one of these photodetectors is made via the previously mentioned conductive layers 22 and 24 shown in FIG. 3.

Also shown in FIG. 3 is a narrow laterally extending region 26, having, for example, a Z-direction width of about 1-to-2 $\mu$m, which serves to electrically isolate the aforedescribed input-end photodetector from the next subsequent photodetector of the device. By way of a particular example, the region 26 is defined during the above-specified n- and p-doping steps by masking the region 26 to prevent any doping thereof during formation of the p-i-n photodetectors. The masked region 26 is thus maintained as intrinsic silicon which in practice serves as an effective electrical isolation barrier between adjacent photodetectors. Other standard known techniques are available for electrically isolating the individual photodetectors from each other. Thus, for example, the region 26 may be doped oppositely from the doping of adjacent photodetecting regions, thereby forming effective p-n junction barriers to current flow between adjacent photodetectors. (In the particular illustrative example depicted in FIGS. 2 and 3 wherein a common contact 24 is employed for the photodetectors, opposite doping to achieve electrical isolation need be done only in that portion of the region 26 that lies on the left side of the depicted photodetectors, that is, the side in FIG. 2 that is marked as being p-doped.) In practice, the portion of the region 26 that extends through the rib waveguide 10 is essentially transparent to optical radiation propagated in the waveguide.

A portion of the next electrically isolated photodetector included in the FIG. 3 device is also represented in the drawing. Electrical connections to this next photodetector are made via conductive layer 28 and the common conductive layer 24. For the particular ilustrative example specified above, six other electrically isolated photodetectors (not shown) are included along the longitudinal extent of the waveguide 10 in the monolithic structure represented in FIG. 3.

Figure 4:
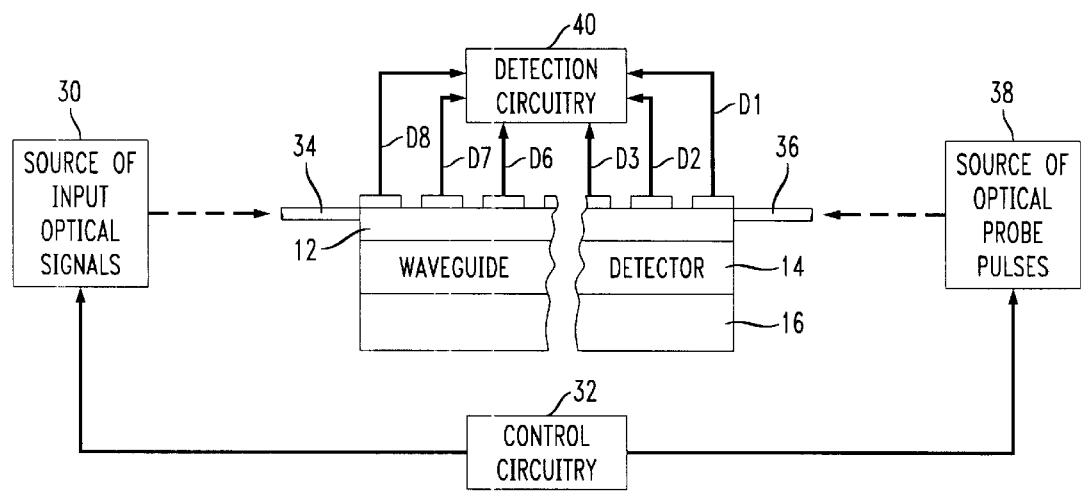
FIG. 4 is a schematic depiction showing the FIG. 3 device interconnected with other components to form a specific illustrative optical TDM system.

A specific illustrative TDM system made in accordance with the principles of the present invention is schematically represented in FIG. 4. A source 30 of input optical signals controlled by circuitry 32 is shown as applying optical signals to an optical fiber 34. By way of a particular example, the fiber 34 is assumed to be a conventional single-mode element designed for low-loss transmission of optical signals having a wavelength of 1550 nanometers (nm), which typically is the preferred wavelength for fiber communication systems.

Optical signals emanating from the right-hand end of the fiber 34 of FIG. 4 are applied to the input or entry face of the rib waveguide 10 of FIG. 3. Various coupling techniques for accomplishing such a transfer of optical power in an efficient manner are well known in the art. Illustratively, the end of the fiber 34 is simply butted up against the entry face of the waveguide 10.

Another single-mode optical fiber 36 is also indicated in the FIG. 4 arrangement. The fiber 36 is designed to apply probe pulses, also, for example, at a wavelength of 1550 nm, to the right-hand face of the rib waveguide 10. Probe pulses are supplied to the right-hand or input end of the fiber 36 by a source 38 under control of the circuitry 32. Illustratively, the left-hand end of the fiber 36 is simply butted up against the right-hand end face of the rib waveguide 10. The timing relationship between optical signals propagating from left-to-right in the waveguide 10 and probe pulses propagating from right-to-left therein will be described in detail later below in connection with the detailed description of FIGS. 6 and 7.

In the particular illustrative example specified herein, the FIG. 3 structure is made of silicon and of other conventional compatible materials that are commonly employed in standard integrated-circuit batch-fabrication processes. Accordingly, it is feasible to fabricate the FIG. 3 structure and associated circuitry such as the detection circuitry 40 and the control circuitry 32 of FIG. 4, as well as other related components such as amplifiers, on a single integrated-circuit chip.

In a particular illustrative embodiment of the invention, the p-i-n photodetectors formed in the layer 12 of FIG. 4 are made of silicon, and the optical signals and pulses applied to the rib waveguide 10 are characterized by a wavelength of 1550 nm. In that case, neither an optical signal by itself nor an optical probe pulse by itself traversing one of the photodetectors has a sufficiently short wavelength to cause incident radiation to be absorbed to any appreciable extentand to cause the generation of a significant number of electron-hole pairs in the photodetector. Accordingly, under those conditions, no significant or usefully distinguishable electrical signal appears at the output terminals of the photodetectors.

Figure 5:
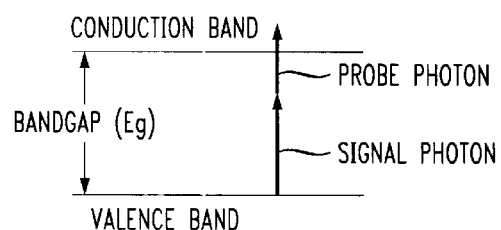
FIG. 5 is a diagram illustrating the two-photon absorption characteristic of the photodetectors included in the system described herein.

The aforedescribed photodetection phenomenon for the p-i-n devices included herein is schematically illustrated by the simplified energy-level diagram shown in FIG. 5. The wavelength corresponding to the semiconductor bandgap $E_g$ is $\lambda_c$. For wavelengths shorter than $\lambda_c$, incident radiation is absorbed by the semiconductor in a known absorption process and a significant number of electron-hole pairs are generated therein. For silicon, $\lambda_c$ is 1100 nm. Thus, as represented in FIG. 5, either an optical signal photon by itself at a wavelength of 1550 nm or an optical probe pulse photon by itself at a wavelength of 1550 nm is unable to initiate the requisite absorption and generation of a significant electrical signal. But if, in a so-called two-photon interaction, both signal and probe pulse photons at 1550 nm simultaneously impinge upon a silicon photodetector in an overlapping fashion, then sufficient energy is available therein to exceed $E_g$, whereby the photons are absorbed and a significant number of electron-hole pairs are generated. In that case, a significant and practically useful electrical output signal from the photodetector is provided.

Electrical output signals provided by the photodetectors of FIG. 4 are applied to detection circuitry 40. These signals are applied to the circuitry 40 via electrical leads that are respectively designated D1, D2, D3, D4, D5, D6, D7 and D8 to indicate the photodetectors from which the signals emanate. The designations D1 . . . D8 will be employed also later in connection with FIG. 7 to indicate from right-to-left the eight photodetectors that exist in the illustrative rib waveguide of FIG. 4.

Figure 6:
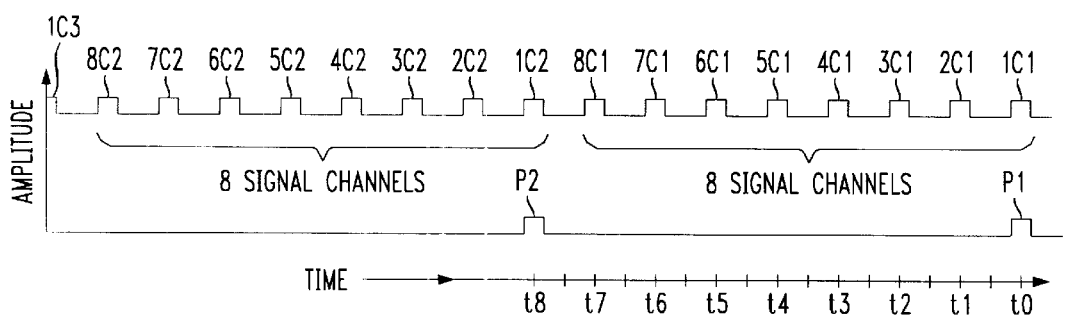
FIG. 6 is a diagram showing the timing relationship between optical signals and counter-propagating optical probe pulses.

In the diagram of FIG. 6, the relative timing between the optical signals and the optical probe pulses propagated in the FIG. 4 arrangement is represented. In particular, seventeen signals and two pulses are depicted. In the illustrative example specified herein, eight signal sequences or channels are interleaved to form the high-speed signal train applied to the fiber 34 (FIG. 4). In FIG. 6, the first bit of the first channel is designated 1C1, the first bit of the second channel is designated 2C1, the first bit of the third channel is designated 3C1, et cetera, with the first bit of the eighth channel being designated 8C1. As indicated, the next bit in the signal sequence is designated 1C2, which is the second bit of the first channel, and so forth in a straightforward way.

In the particular illustrative example specified herein, the optical signal train shown in FIG. 6, which propagates from left-to-right in FIG. 4, comprises 0.5-ps signals and has a repetition rate of one teraHertz, and the counter-propagating probe pulses, which propagate from right-to-left in FIG. 4, comprise 0.5-ps pulses and have a repetition rate of 125 gigaHertz. As will be described in detail in connection with FIG. 7, the first optical probe pulse, designated P1, is effective in conjunction with overlapping optical signals to cause electrical output signals to be generated in succession in photodetectors D1 through D8 that are respectively representative of the signals designated 1C1, 2C1, 3C1, 4C1, 5C1, 6C1, 7C1 and 8C1. The first such output signal occurs at time t0 when P1 and 1C1 overlap in photodetector D1, thereby causing two-photon non-linear absorption in D1. The next output signal occurs at time t0.5 when P1 and 2C1 overlap in photodetector D2, thereby causing two-photon absorption in D2. Later, at t8, P2 and 1C2 overlap in D1 and an output signal (the second bit of the first signal channel) is generated by D1 and applied to the circuitry 40 of FIG. 4.

Figure 7:
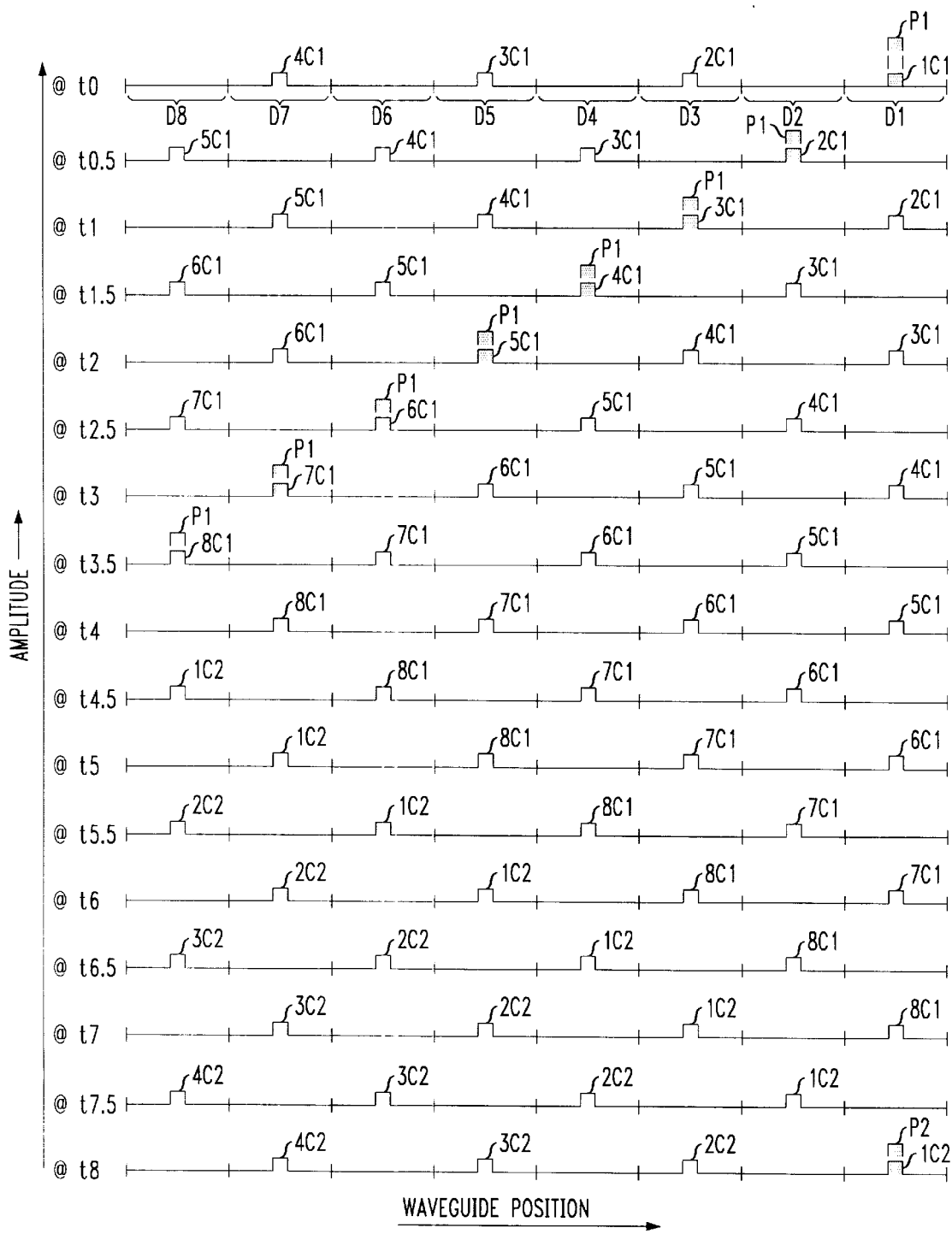
FIG. 7 is a timing diagram illustrating the manner in which the probe pulse overlaps with successive incoming signals in respectively different photodetectors of the depicted system.

The aforedescribed timing relationship between the optical signals and the optical probe pulses propagating in the waveguide 10 is shown in detail in FIG. 7. Thus, at t0, P1 and 1C1 are depicted as being in an overlapping relationship approximately in the center of D1. (Each pair comprising an optical signal and an overlapping optical probe pulse is highlighted in FIG. 7 by a number of dots within the respective envelopes of each pair.) Accordingly, at t0 in FIG. 7, a significant electrical output signal is generated in photodetector D1 in response to two-photon absorption therein. In turn, this electrical signal is applied to the detection circuitry 40 of FIG. 4.

In the particular illustrative embodiment described herein, optical signals and pulses propagating in the silicon waveguide 10 each travel approximately ninety $\mu$m along the longitudinal extent thereof in one ps. (The exact speed of propagation depends on the particular waveguide design, as is well known in the art.) Thus, as indicated at t0 in FIG. 7, if probe pulse P1 and signal 2C1 are at that instant of time ninety $\mu$m apart, one-half ps later, as shown on the time line designated t0.5, the probe pulse P1 will have traveled in the waveguide forty-five $\mu$m to the left and the signal 2C1 will have traveled therein forty-five $\mu$m to the right. Accordingly, if each of the photodetectors formed in the waveguide 10 is designed to have a longitudinal extent (in the Z direction indicated in FIG. 3) of forty-five $\mu$m, the overlapping of P1 and 2C1 shown at t0.5 will occur approximately in the middle of photodetector D2. Hence, at t0.5, a significant electrical output signal is generated in photodetector D2 in response to two-photon absorption therein. This electrical signal is applied to the detection circuitry 40 of FIG. 4.

In a similar way, the remaining time-line depictions of FIG. 7, at t1 through t3.5, show the manner in which optical probe pulse P1, while propagating to the left in the waveguide 10, successively overlaps with incoming optical signals 3C1, 4C1, 5C1, 6C1, 7C1 and 8C1 to cause two-photon absorption in photodetectors D3 through D8, respectively. In that way, useful electrical output signals are respectively generated in the photodetectors D3 through D8, at one-half ps intervals, and successively applied to the detection circuitry 40 of FIG. 4.

Subsequently, at t8 of FIG. 7, after an interval of 4.5 ps, which allows propagating optical signal 1C2 to reach approximately the center of photodetector D1 in the rightmost portion of the elongated waveguide 10, the next optical probe pulse P2, which was launched into the right-hand end of the waveguide at approximately t7.75, overlaps with 1C2. Two-photon non-linear absorption in D1 thereby occurs. As a result, an electrical signal representative of the second bit of the first signal channel is thereby generated and applied to the detection circuitry 40 of FIG. 4.

As indicated in the particular illustrative example represented in FIGS. 6 and 7, the time interval between the generation in photodetector D1 of successive electrical output signals indicative of 1C1 and 1C2 (and of subsequent bits of the first signal channel) is eight times greater than the time interval between successive optical signals propagated in the fiber 34 and in the waveguide 10. Accordingly, the electrical detection circuitry connected to the output of D1 need operate at a rate that is only one-eighth that of the rate of incoming signals.

For illustrative purposes only, the high-speed signal train shown in the drawing comprises a sequence in which every bit position contains a signal and is thus representative of a "1" bit. In practice, of course, each individual bit position may contain such a signal, indicating a "1", or no signal, indicating a "0", in a manner representative of a specific digital data information sequence.

Also, as stated earlier above, the number of signal channels specified herein (eight) is exemplary only. More or fewer channels are feasible. It may be advantageous, for example, to greatly increase the number of channels, thereby to significantly reduce the speed at which the electrical detection circuitry connected to each photodetector need operate. If, for example, the depicted TDM system (operating at one teraHertz) is designed to have 100 interleaved channels, the detection circuitry need operate at only a ten gigaHertz rate.

Finally, it is to be understood that the above-described arrangements and techniques are only illustrative of the principles of the present invention. In accordance with these principles, numerous modifications and alternatives may be devised by those skilled in the art without departing from the spirit and scope of the invention. Thus, for example, other types of elongated waveguides made of a silicon-based material system or made of other systems based on III–V materials are feasible for fabricating a structure of the type described herein. And, of course, wavelengths other than the particular ones specified above may be selected for the optical signals and probe pulses that propagate in the elongated waveguide. Further, higher-order photon absorption processes may also be employed. In each case, it is simply necessary that the sum of a signal photon and a probe photon exceed the bandgap energy of the waveguide material. In that way, non-linear absorption in each photodetector of the waveguide occurs whenever an optical signal and a counter-propagating probe pulse overlap. Also, it is apparent that the intensity of incoming optical signals to be applied to the waveguide may be enhanced by conventional optical preamplification.

What is claimed is:

1. An optical time-division-multiplex system comprising an elongated waveguide comprising m electrically isolated photodetectors formed integral with and as part of said waveguide itself in m respectively spaced-apart portions of said waveguide along the longitudinal extent of the waveguide, said waveguide including entry and exit faces at the respective ends thereof, means for applying an optical signal stream comprising m interleaved signal sequences to said entry face for propagation in said waveguide along the longitudinal extent thereof and thus through said spaced-apart electrically isolated photodetectors formed integral with said waveguide, said signal stream having a repetition rate of f1, wherein each signal by itself has insufficient energy to cause non-linear absorption in a photodetector through which the signal propagates, and means for applying optical probe pulses to the exit face of said waveguide for propagation in said waveguide along the longitudinal extent thereof and thus through said spaced-apart electrically isolated photodetectors formed integral with said waveguide at a repetition rate of f2 in synchronism with said signal stream to cause each different probe pulse to overlap each one of a different set of m successive signals in said waveguide in respectively different photodetectors as each probe pulse propagates from said exit face toward said entry face, each such overlap in a photodetector causing non-linear absorption therein in a two-photon process to provide electrical output signals from each photodetector at a repetition rate of f1/m, where f2 equals f1/m and wherein each pulse by itself has insufficient energy to cause non-linear absorption in a photodetector through which the pulse propagates.

2. A system as in claim 1 wherein said first-mentioned applying means comprises a single-mode optical fiber.

3. A system as in claim 2 wherein one end of said fiber is disposed to couple optical signals into the entry face of said waveguide.

4. A system as in claim 3 further including a source of optical signals coupled to the other end of said fiber.

5. A system as in claim 4 wherein said second-mentioned applying means also comprises a single-mode optical fiber.

6. A system as in claim 5 wherein one end of said second-mentioned fiber is disposed to couple probe pulses into the exit face of said waveguide.

7. A system as in claim 6 further including a source of optical probe pulses coupled to the other end of said second-mentioned fiber.

8. A system as in claim 7 still further including control circuitry connected to said source of input optical signals and to said source of optical probe pulses for synchronizing the application of said signals and pulses to the respective ends of said waveguide.

9. A system as in claim 8 further including electrical detection circuitry connected to said photodetectors.

10. A system as in claim 9 wherein said elongated waveguide comprises a rib waveguide made of silicon, each of said photodetectors comprises a p-i-n device, and each of said optical signals and optical probe pulses is characterized by a wavelength of 1550 nm.

11. A system as in claim 1 wherein electrical isolation between adjacent photodetectors formed integral with said waveguide is provided by spaced-apart optically transparent electrical-isolation-barrier regions formed integral with and in said waveguide along the longitudinal extent of said waveguide.

* * * * *